Figure 1:
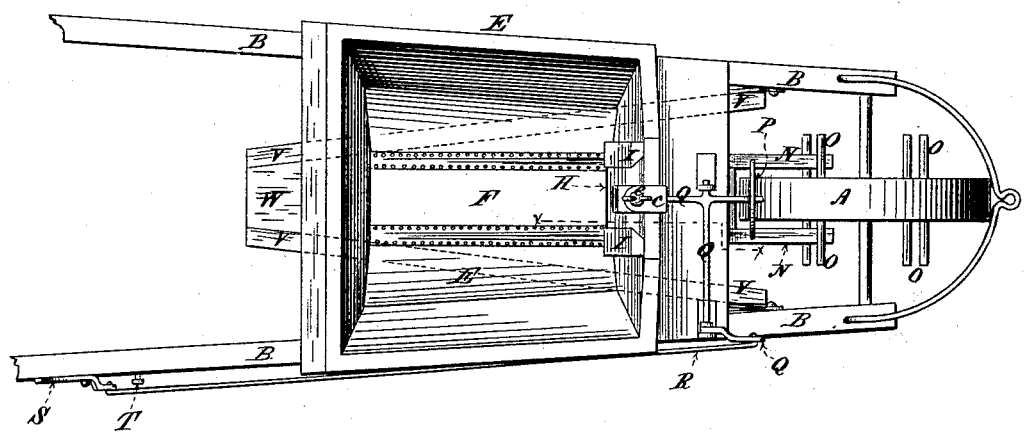

(No Model.) 2 Sheets—Sheet 1.

J. B. DENTON.
FERTILIZER DISTRIBUTER.

No. 336,798. Patented Feb. 23, 1886.

Witnesses:
C. J. Hedrick
Fred E. Tasker

Inventor:
Joseph B. Denton
by A. Pollok
his attorney (No Model.) 2 Sheets—Sheet 2.
J. B. DENTON.
FERTILIZER DISTRIBUTER.
No. 336,798. Patented Feb. 23, 1886.
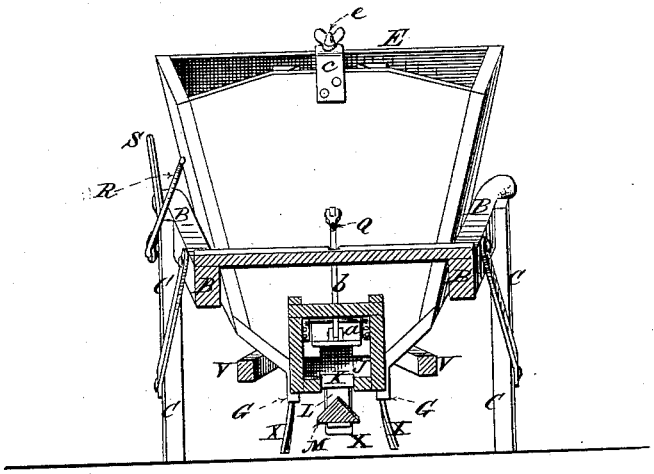
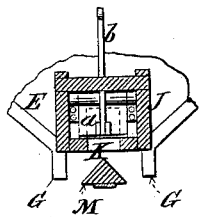
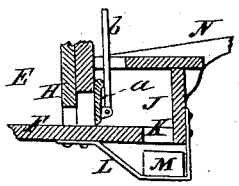
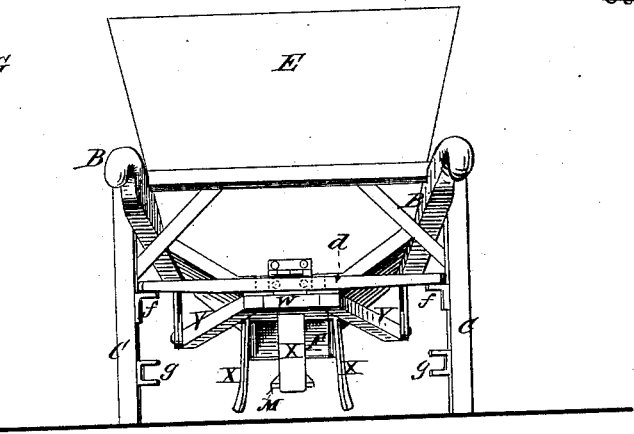

UNITED STATES PATENT OFFICE.

JOSEPH B. DENTON, OF NEWTOWN, NEW YORK.

FERTILIZER-DISTRIBUTER.

SPECIFICATION forming part of Letters Patent No. 336,798, dated February 23, 1886.

Application filed September 24, 1885. Serial No. 178,007. (No model.)

*To all whom it may concern:*

Be it known that I, JOSEPH B. DENTON, of Newtown, in the county of Queens and State of New York, have invented a new and useful Improvement in Fertilizer-Distributers, which improvement is fully set forth in the following specification.

My invention consists of certain improvements upon the structure shown in Letters Patent No. 314,920, granted to me, dated March 31, 1885. Several difficulties which practical experience has shown in that structure have been obviated, and the changes that I have made, although apparently slight, are of great practical importance in the economy and convenience of working the fertilizer-distributer. One of the difficulties to be overcome was in the cut-off. The object of the cut-off is to completely arrest the outflow of the manure when desired, and this result is accomplished by the device hereinafter described, but has only been heretofore partially accomplished.

A fertilizer-distributer consists of an ordinary wheelbarrow with its arms and wheel and hopper. The hopper is open at its forward end, where the manure or fertilizer can flow out. The central part of the bottom of the hopper, from end to end, consists of a part separate from the rest, which is hinged at the rear end, and which can be slightly lowered or depressed at will. This hinged part is continued forward beyond the forward end of the hopper, and this continuation forms a portion of a small hopper or distributing-box, into which the fertilizer must pass before it reaches the ground, there being an opening in the botton of this box, and immediately underneath the opening a triangular block for scattering the fertilizer and preventing its all dropping along a comparatively narrow line. Attached to the farther end of this distributing-box are two prongs. Upon the wheel, about half-way between the center and the circumference, is a series of horizontal pins placed at right angles to the direction of the wheel. The prongs referred to are of such a length that when the hinged planks, with the distributing-box and prongs, are raised the prongs and pins will not come in contact when the wheel goes round, but when they are lowered, as they are ordinarily when the fertilizer is being distributed, they will be struck by the pins, thus causing an agitation, which prevents the manure from clogging and shakes it down with the rapidity desirable in the direction of the opening in the forward end of the hopper. This is all shown in the previous patent referred to, and, for the sake of greater convenience, I will follow as nearly as possible the figures and lettering therein shown.

Figure 2:
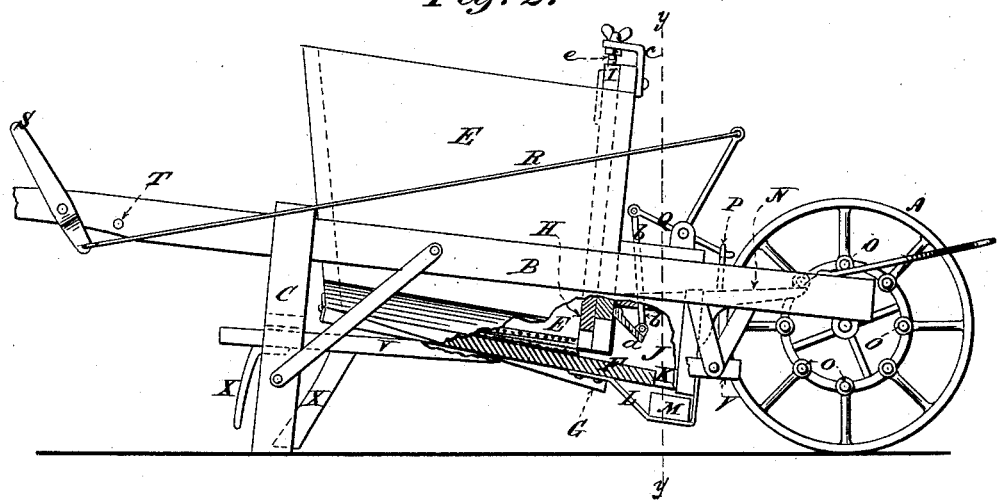

Figure 1 is a plan view of my improvement. Fig. 2 is a side elevation of the same, partly in section, through the broken line $x\,x\,x\,x$, Fig. 1. Fig. 3 is a sectional front elevation of the same, taken through the line $y\,y$, Fig. 2. Fig. 4 is a front view of the valve $a$ and the parts adjacent thereto, and Fig. 5 is a central cross-section thereof. Fig. 6 is a view from the rear of cross-bar $d$, the legs of the wheelbarrow, and the brackets $f$ and $g$, and the cultivator-teeth, with a section of certain adjacent parts.

A represents the drive-wheel, which is journaled to and between the forward ends of the side bars of the frame B. The rear ends of the side bars serve as handles, and the side bars are provided with legs C. Thus far the construction is that of a wheelbarrow.

E is the hopper or feed-box, the middle board, F, of the bottom of which is loose and hinged at its rear end to the lower edge of the back of the hopper, so that the forward end of the board can have an up-and-down swing. If necessary, the bottom of the hopper, including the board F, can be protected on its inner side by some suitable flexible material to prevent loss of fertilizer. The forward part of the board F is kept from lateral movement by downwardly-projecting flanges G, attached to the bottom of the hopper E adjacent to the side edges of the vibrating board F. The lower edge of the front of the hopper E over the board F is recessed, as shown in Figs. 2 and 3, so that the fertilizer can pass out freely. The amount of fertilizer distributed can generally be regulated by a gate, H, sliding in rabbeted cleats I, attached to the inner surface of the front of the hopper E. The forward ends of the board F project and form part of a box, J, which prevents the fertilizer from falling off the edges of the forward projecting part of the board, which box is open at the rear to admit the fertilizer freely; but it has been found in practice that the gate H does not thoroughly cut off the flow of the manure when it is desired to do so, but there is a considerable waste, which I have avoided by attaching to the forward side of the opening in the hopper a valve, *a*, attached to the outside forward end of the hopper by brackets, or in any other convenient way, and working within the box J, and opened and shut by a bar, *b*, attached to the lever Q. This valve is readily opened and closed at will, in the manner hereinafter described.

In the forward end of the board F is formed an opening, K, through which the fertilizer falls to the ground.

To the lower side of the forward part of the board F is attached an arm, L, which projects downward and forward and then upward to the forward side of the box J, and to it, directly below the discharge-opening K, is attached a triangular block, M, upon which the fertilizer falls from the opening, and is scattered and prevented from falling along too narrow a line.

To the top of the box J are attached two arms, N, which project forward upon opposite sides of the wheel A. To the wheel A, at a little distance from its hub, is attached a circle of horizontal pins, O, the ends of which project upon opposite sides of the wheel A, and the ends of the arms N strike against them, so that the board F is jarred as the arms N drop from one pin to the next, and thus prevent clogging and cause the fertilizer to pass out regularly.

To the middle of the arms N are attached the ends of a bail, P, with which engages the forwardly-projecting arm of the bent lever Q, the middle part of which rocks in bearings attached to a cross-bar or forward support of the frame B. To the end of the upwardly-projecting arm of the bent lever Q is pivoted the forward end of the connecting-rod R, the rear end of which is pivoted to the end of the short arm of the lever S. The lever S is pivoted to the side of the rear end of the handle of the frame B. By throwing the long arm of the lever S forward (which can be done by sliding forward the hand while holding the handle) the bent lever Q will raise the arms N out of contact with the pins O.

It is preferable that the lever Q should not be rigidly attached to the bail P, but should, when its forward end is lowered, be free from the bail, and should only engage with the bail when the forward end is raised sufficiently to bring the prongs out of contact with the pins, and at the same time the other end of the lever, by means of a bar, *b*, will completely close the valve *a*.

The long arm of the lever S when swung forward rests upon a stop-pin, T, attached to the handle of the frame B, so as to be a little below the line of the connecting-rod R, so that the arms N and the board F will be locked in a raised position. The long arm of the lever S can be swung back to drop the bar N and raise the valve *a* into a working position by pressing the short arm of the lever S downward with the thumb that holds the side of the frame, without removing the hand from the said side bar.

The gate or slide H is adjusted by means of a bracket, *c*, fastened to the middle of the forward part of the hopper by screws or in any other way, and on the outside thereof, and extending somewhat beyond the top inward, and having a hole so arranged that a screw, *e*, inserted in the bracket will engage with the slide in any convenient way, and by means of the screw and bracket, and a nut upon the screw, the slide can be raised and lowered at will, and set to such a position as will allow a proper quantity of fertilizer to pass out.

To the insides of the forward parts of the side bars of the frame B are fastened the inwardly-inclined ends of two bars, V, which extend back beneath the hopper E, and are attached at their rear ends to the opposite side edges of the harrow-frame, block, or plate W, to which the cultivator-teeth X X X are attached to mix the fertilizer or soil. These cultivator-teeth are different from any that have been heretofore used, and their working is most satisfactory. They should be much wider than have been heretofore used. I have found a width of two inches to work satisfactorily in an ordinary-sized distributer. The middle tooth should be placed at right angles, or nearly so, to the course that the distributer takes, and all these teeth should be slightly inclined, so that their lower ends are farthest toward the rear to produce the best result. The side teeth are inclined slightly outward in the direction of movement of the apparatus. In practical operation it is found that by this arrangement the fertilizer is thoroughly mixed in the soil, and at the same time by simply raising the handles of the wheelbarrow, any accumulation of weeds, &c., which has gathered upon the cultivator-teeth will drop.

On top of the block W, and firmly attached thereto, there is pivoted a bar, *d*, which extends between the legs of the wheelbarrow. When the distributer is not in operation, and at the same time it is desired to move the distributer from one place to another, it can be readily accomplished by placing the bar upon two brackets, *f*, on the inner side of the legs of the wheelbarrow, which serve as supports, these brackets being placed at such a distance that the cultivator-teeth will not touch the ground when the ends of the handles of the barrow are held in the ordinary way. Underneath these brackets, and between them and the lower ends of the legs of the wheelbarrow there are two other brackets or cleats, *g*, (preferably double brackets,) fastened to the insides of the legs. When it is desired that the fertilizer should be operated, the bar is turned free of the upper brackets, the bar, the block W, and the two bars V, with the hopper, &c., will all fall, and the bar should then be turned so as to be firmly fastened in or upon the lower brackets, which should hold them firmly while working. This arrangement has been found to be of great convenience in practical use.

Having thus described my invention, I claim as new and desire to secure by Letters Patent—

1. In a fertilizer-distributer, the adjustable valve $a$, for the purpose of arresting the outflow of the fertilizer or manure, in combination with a lever pivoted to the handle of the wheelbarrow, and connections for operating said valve by said lever, substantially as described.

2. In a fertilizer-distributer, the combination of the cross-bar $d$, pivoted to the block W, and adjustable on brackets attached to the legs of the wheelbarrow.

3. In a fertilizer-distributer, the combination, with the hopper having an opening and a slide for regulating the outflow of the fertilizer, of the valve arranged and operating substantially as described.

4. In a fertilizer-distributer, the combination, with the hopper having an outlet-opening, of the slide, the bracket, and the screw for adjusting said slide to regulate the size of said opening, substantially as described.

5. In a fertilizer-distributer, the combination, with the distributing devices, of the wide cultivator-teeth placed in the rear thereof, one of said teeth being arranged substantially at right angles to the line of movement of the distributer, and the others arranged obliquely to said line, as set forth.

In testimony whereof I have signed this specification in the presence of two subscribing witnesses.

JOSEPH B. DENTON.

Witnesses:
B. F. LEE,
JOHN McCLURE.